United States Patent
Ogi et al.

(10) Patent No.: US 6,891,558 B2
(45) Date of Patent: May 10, 2005

(54) OPTICAL WRITE-IN HEAD, IMAGE FORMING APPARATUS USING THE SAME, AND METHOD FOR INSPECTING THE APPARATUS

(75) Inventors: Shuya Ogi, Osaka (JP); Tomitaka Takagi, Osaka (JP); Koichiro Iki, Osaka (JP); Minoru Toyama, Osaka (JP)

(73) Assignee: Nippon Sheet Glass Co., Ltd., Osaka (JP)

( * ) Notice: Subject to any disclaimer, the term of this patent is extended or adjusted under 35 U.S.C. 154(b) by 140 days.

(21) Appl. No.: 10/236,638

(22) Filed: Sep. 6, 2002

(65) Prior Publication Data

US 2003/0043255 A1 Mar. 6, 2003

(30) Foreign Application Priority Data

Sep. 6, 2001 (JP) ....................................... 2001-270711
Oct. 5, 2001 (JP) ....................................... 2001-310226

(51) Int. Cl.[7] ............................................... G02B 3/00
(52) U.S. Cl. ...................................... 347/244; 347/258
(58) Field of Search ................................ 347/241, 244, 347/256, 258, 233; 359/654

(56) References Cited

U.S. PATENT DOCUMENTS 5,233,469 A   8/1993  Araki ........................... 359/652
6,031,668 A * 2/2000  Toyama et al. .............. 359/654
6,473,106 B2 * 10/2002 Fukasawa ...................... 347/130

FOREIGN PATENT DOCUMENTS

| EP | 0786353 A1 | 7/1997 |
| EP | 0926513 A2 | 6/1999 |
| EP | 1106366 A2 | 6/2001 |
| JP | 2001-083044 | 3/1991 |
| JP | 2001-205845 | 7/2001 |
| JP | 2001-255230 | 9/2001 |
| JP | 2001-264210 | 9/2001 |
| JP | 2001-272302 | 10/2001 |

* cited by examiner

Primary Examiner—Huan Tran
(74) Attorney, Agent, or Firm—Sheridan Ross PC

(57) ABSTRACT

An optical write-in head for obtaining a clear image even in printing at a relatively high recording density without generating strip-like irregularities in most cases. The optical write-in head applies light carrying image information to a photosensitive substance. The optical write-in head includes an array light source having a plurality of dot light sources, each of which selectively emits the light corresponding to the image information, and a lens array facing the array light source. The lens array has a plurality of lens elements which corresponds to the plurality of dot light sources respectively. An angular aperture $\theta$ of each of the lens elements is set in a range of about 14° to 18°.

24 Claims, 8 Drawing Sheets

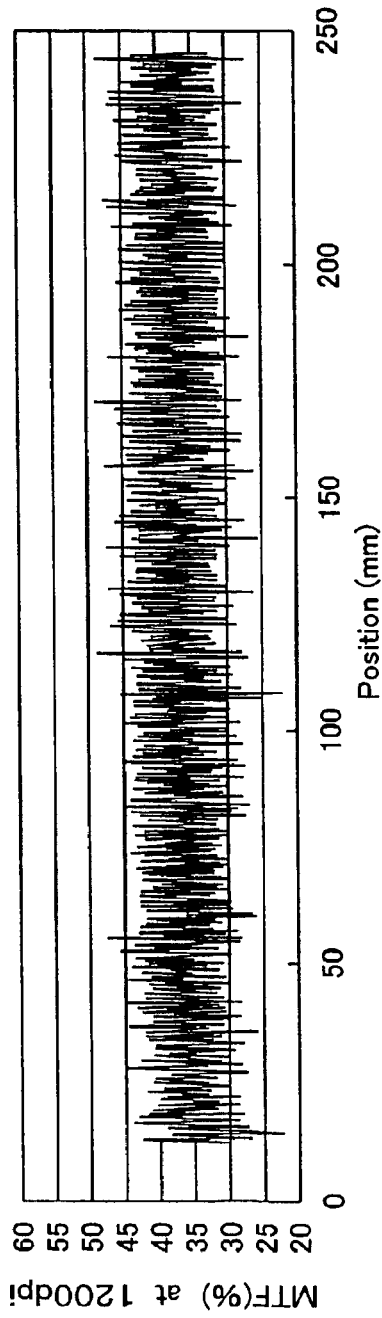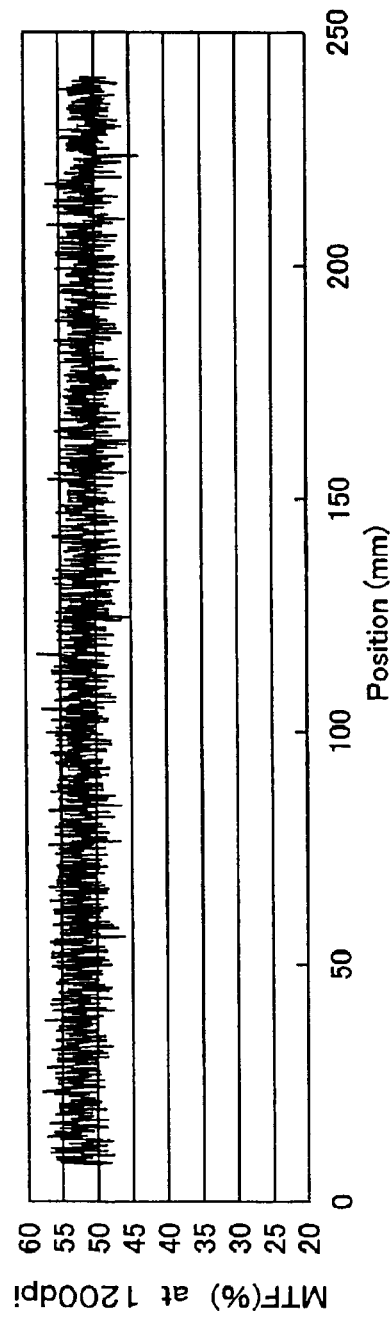

OPTICAL WRITE-IN HEAD, IMAGE FORMING APPARATUS USING THE SAME, AND METHOD FOR INSPECTING THE APPARATUS

BACKGROUND OF THE INVENTION

The present invention relates to an optical write-in head and an image forming apparatus using the same and, more particularly to, an optical write-in head which writes information sent from a row of light sources selectively emitting light corresponding to image information to a photosensitive substance using a gradient index rod lens array, an image forming apparatus using the same, and a method for inspecting the image forming apparatus.

Conventionally, as an optical write-in head for writing optical information sent from a row of light sources, such as an LED array or a liquid crystal display (LCD) shutter array, emitting light corresponding to image information to a photosensitive substance on a photosensitive drum or a photographic printing paper sheet, there are mainly available the following two types of gradient index rod lens arrays.

(I) Such a rod lens array that each rod lens (hereinafter called a lens element) thereof has angular aperture θ in a range of 20 to 23°. The rod lens array of type (I) has the following merits. (a) It has a high coupling efficiency and light load on a light-source row's emitted light amount and a photosensitive-substance sensitivity. If the light source row is an LCD shutter array, the light-source row's emitted light amount is equal to a light amount of back light which is emitted from the LCD shutter array and has passed therethrough. (b) It has a relatively short conjugate length TC, so that a relevant apparatus can be downsized. (c) It has the relatively short conjugate length TC and so is not easily influenced by an inclination of an array of the lens elements.

(II) Such a rod lens array that each lens element thereof has angular aperture θ within a range of 10.5 to 12°. The rod lens array of type (II) has the following merits. (d) It has a high basic resolution, so that a clear photographic pint-out can be obtained. (e) It has a relatively large focus depth and so can easily accommodate an attachment error, eccentricity of the photosensitive drum, etc.

The rod lens array of type (I), however, has a problem that it is difficult to obtain a clear image free of stripes in printing at a high recording density of approximately 1200 dpi (dot/inch). The reasons are as follows. (i) Generally, the resolution becomes higher as the angular aperture becomes smaller. In the case of type (I), since the angular aperture θ is a large value of 20 to 23°, a not so high resolution level can be attained, so that it is impossible to obtain a resolution of 1200 dpi. (ii) Although the lens element has a larger curvature of field as the angular aperture is larger, the angular aperture θ is the large value of 20 to 23°, thus giving a large resolution fluctuation in a period of a lens diameter/radius.

(iii) The angular aperture θ has a large value of 20 to 23°, so that the focus depth is small. Accordingly, the resolution is significantly deteriorated by a defocus of approximately ±20 μm, which is inevitable due to an attachment error, eccentricity of the photosensitive drum, etc. The term "defocus" here refers to that of the lens element with respect to the centerline interconnecting the light source and the photosensitive drum.

The rod lens array of type (II) has the following problems. (i) Load is heavy on a light-source row's emitted light amount and a photosensitive substance's sensitivity, so that a full-scale cooling mechanism is necessary depending on a printing speed. This is because the angular aperture θ has a large value of 10.5 to 12.0° and, therefore, the coupling efficiency of this type of rod lens array is only ¼ of that of the type (I) of rod lens array. (ii) Since the conjugate length TC of this type of rod lens array is nearly double that of the type (I) of rod lens array, the apparatus becomes large. (iii) Since the conjugate length TC is large, an inclination of the array of the lens elements has a large influence, so that stripe-like irregularities are liable to appear locally.

Thus, in printing at a high recording density of approximately 1200 dpi, a requirement for obtaining a clear image free of stripes cannot be satisfied by type (I) or (II) of rod lens array, both of which have advantages as well as disadvantages.

In an electro-photographic-type image forming apparatus using the conventional lens array, stripe-like irregularities may appear in an output image owing to fluctuations in optical characteristics of each of the lenses of the lens array. The stripe-like irregularities are caused not by a low absolute value of the resolution but by a large difference from the surroundings in resolution. These irregularities are distinct particularly when such stripes appear in a period of 1 to 5 mm because the width/period of the stripes that can be easily recognized by the naked eye is about 0.5 to 10 mm.

In evaluation of a picture quality of an image formed by the image forming apparatus, conventionally, a light source array, a lens array, and a photosensitive substance are assembled into an apparatus, which is then operated actually to carry out photo-reaction and development processes, so that a resultantly formed image is checked for irregularities. In the present situation, it is possible to know whether there are stripe-like irregularities caused by the lens array only after the apparatus is assembled.

Therefore, if, as result of evaluation, some stripe-like irregularities are found in the image and its picture quality obtained is decided to be poor, the apparatus needs to be disassembled to identify a cause. That is, it is necessary to analyze the factor of the appearance of the stripe-like irregularities on whether it is ascribed to the lens array or the light source array. Furthermore, if the lens array is decided to be defective, a non-defective lens array must be used to assemble the apparatus again. This makes the inspection process more time consuming and labor intensive, thus resulting in poor productivity of the apparatus.

SUMMARY OF THE INVENTION

It is an object of the present invention to provide an optical write-in head which enables obtaining a clear image even in printing at a relatively high recording density without generating strip-like irregularities in most cases and an image forming apparatus using the same.

It is another object of the present invention to provide a method for enabling inspecting an image forming apparatus which can evaluate stripe-like irregularities ascribed to an lens array before the apparatus is assembled and improving the productivity.

To achieve the above object, the present invention provides an optical write-in head for applying light carrying image information to a photosensitive substance. The optical write-in head includes an array light source having a plurality of dot light sources, each of which selectively emits the light corresponding to the image information, and a lens array facing the array light source. The lens array has a plurality of lens elements which corresponds to the plurality of dot light sources respectively. An angular aperture θ of each of the lens elements is set in a range of about 14° to 18°.

A further perspective of the present invention is an optical write-in head for applying light carrying image information to a photosensitive substance. The optical write-in head includes an array light source having a plurality of dot light sources, each of which selectively emits the light corresponding to the image information, and a lens array facing the array light source. The lens array has a plurality of lens elements which corresponds to the plurality of dot light sources respectively. Each of the plurality of lens elements receives the light from a corresponding one of the dot light sources to focus the light on the photosensitive substance in order to forming a dot image. An image forming range in which the lens array interconnects the dot images is divided at a predetermined width to define a plurality of image forming sections. The lens array has one of the following five characteristics: [1] a characteristic that when the dot light sources are each lit, a difference between an average and the minimum of the contrast of the dot images in each of the image forming sections is about 18% or less; [2] a characteristic that when the dot light sources are each lit, a difference between the maximum and the minimum of the contrasts of the dot images is about 30% or less in each of the image forming sections. [3] a characteristic that when the dot light sources are each lit, the difference between the average of the contrasts of the dot image in each of the image forming sections and the average of the contrasts of the dot image in the adjoining image forming section is about 10% or less; [4] a characteristic that when the dot light sources are each lit, a standard deviation of the contrasts of the dot images all over the image forming range is about 5% or less; and [5] a characteristic that when the dot light sources are each lit, the standard deviation of the contrasts of the dot images all over the image forming range is about 12% or less of the average of the contrasts of the dot images all over the image forming range.

A further perspective of the present invention is an image forming apparatus including a drum having a surface on which a photosensitive substance is formed, and an optical write-in head which applies light carrying image information to the photosensitive substance. The optical write-in head includes an array light source having a plurality of dot light sources each selectively emitting the light corresponding to the image information, and a lens array facing the array light source. The lens array has a plurality of lens elements which corresponds to the plurality of dot light sources respectively. An angular aperture θ of each of the lens elements is set in a range of about 14 to 18°.

A further perspective of the present invention is an image forming apparatus including a drum having a surface on which a photosensitive substance is formed, and an optical write-in head which applies light carrying image information to the photosensitive substance. The optical write-in head includes an array light source having a plurality of dot light sources each selectively emitting the light corresponding to the image information, and a lens array facing the array light source. The lens array has a plurality of lens elements which corresponds to the plurality of dot light sources respectively. Each of the lens elements receives the light from corresponding one of the dot light sources to focus the light on the photosensitive substance in order to forming a dot image. An image forming range in which the lens array interconnects the dot images is divided at a predetermined width to define a plurality of image forming sections. The lens array has one of the following five characteristics: [1] a characteristic that when the dot light sources are each lit, a difference between an average and the minimum of the contrast of the dot images in each of the image forming sections is about 18% or less, [2] a characteristic that when the dot light sources are each lit, a difference between the maximum and the minimum of the contrasts of the dot images is about 30% or less in each of the image forming sections, [3] a characteristic that when the dot light sources are each lit, the difference between the average of the contrasts of the dot image in each of the image forming sections and the average of the contrasts of the dot image in the adjoining image forming section is about 10% or less, [4] a characteristic that when the dot light sources are each lit, a standard deviation of the contrasts of the dot images all over the image forming range is about 5% or less, and [5] a characteristic that when the dot light sources are each lit, the standard deviation of the contrasts of the dot images all over the image forming range is about 12% or less of the average of the contrasts of the dot images all over the image forming range.

A further perspective of the present invention is a method for inspecting an image forming apparatus. The image forming apparatus includes an optical write-in head which applies light carrying image information to a photosensitive substance. The optical write-in head includes an array light source having a plurality of dot light sources each selectively emitting the light corresponding to the image information and a lens array facing the array light source. The lens array has a plurality of lens elements which corresponds to the plurality of dot light sources respectively. The method includes arranging the array light source and a light receiving element which receives the light from the plurality of dot light sources at a conjugate position with respect to the lens array, lighting up the array light source through a uniform light emitting pattern all over an effective width of the lens array, moving the array light source and the lens array toward the light receiving element in a direction in which lenses of the lens array are arranged to thereby cause the light receiving element to detect a light amount of each of the dot images interconnected by the lens array, obtaining the contrast of all the dot images in an image forming range in which lens array interconnects the dot images, dividing the image forming range at a predetermined width to form a plurality of image forming sections, calculating the average of the contrasts of the dot images in each of the sections in accordance with a detection result by the light receiving element, and deciding whether a difference between the average and the minimum of the contrasts of the dot images in each of the sections is not more than a predetermined value.

A further perspective of the present invention is a method for inspecting an image forming apparatus. The method includes arranging the array light source and a light receiving element which receives the light from the plurality of dot light sources at a conjugate position with respect to the lens array, lighting up the array light source through a uniform light emitting pattern all over an effective width of the lens array, moving the array light source and the lens array toward the light receiving element in a direction in which lenses of the lens array are arranged to thereby cause the light receiving element to detect a light amount of each of the dot images interconnected by the lens array, obtaining the contrast of all the dot images in the image forming range in which lens array interconnects the dot images, dividing the image forming range at a predetermined width to form a plurality of image forming sections, and deciding whether a difference between the maximum and the minimum of the contrasts of the dot images in each of the sections is not more than a predetermined value.

A further perspective of the present invention is a method for inspecting an image forming apparatus. The method includes arranging the array light source and a light receiving element which receives the light from the plurality of dot light sources at a conjugate position with respect to the lens array, lighting up the array light source through a uniform light emitting pattern all over an effective width of the lens array, moving the array light source and the lens array toward the light receiving element in a direction in which lenses of the lens array are arranged to thereby cause the light receiving element to detect a light amount of each of the dot images interconnected by the lens array, obtaining the contrast of all the dot images in the image forming range in which lens array interconnects the dot images, dividing the image forming range at a predetermined width to form a plurality of image forming sections, calculating the average of the contrasts of the dot images in each of the sections in accordance with a detection result by the light receiving element, and deciding whether a difference between the average of the contrasts of the dot images in each of the sections and the average in the adjoining section is not more than a predetermined value.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIGS. 5A and 5B are graphs for showing an example of actual measurement of an MTF profile of the two-row rod lens array;

DESCRIPTION OF THE PREFERRED EMBODIMENTS

Figure 1:
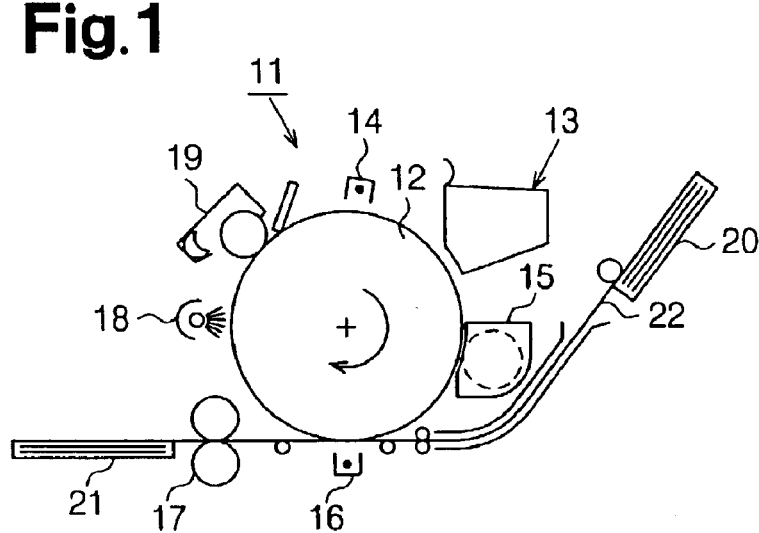
FIG. 1 is a schematic configuration diagram for showing an optical printer related to a first embodiment of the present invention.

In the drawings, like numerals are used for like elements throughout.

Figure 2:
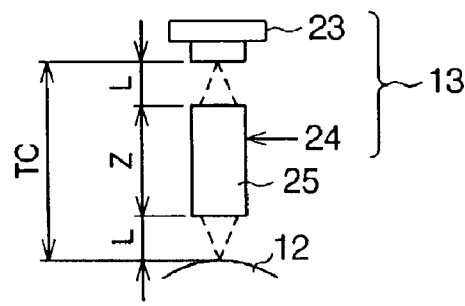
FIG. 2 is a schematic configuration diagram for showing an LED print head of the optical printer in FIG. 1.
Figure 3:
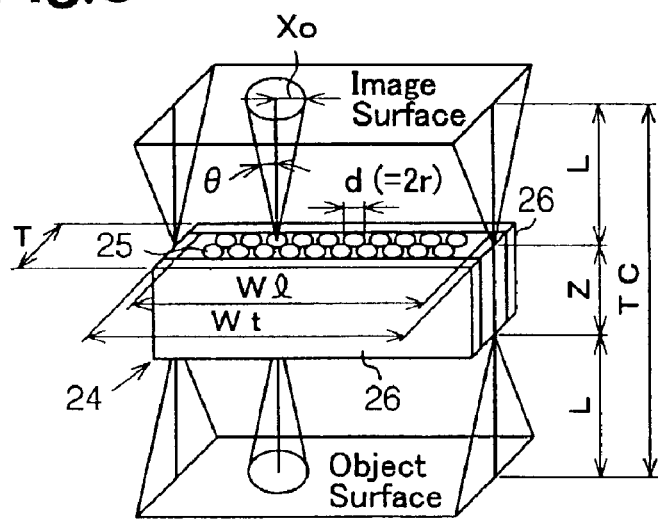
FIG. 3 is a perspective view for showing a rod lens array of the LED print head in FIG. 2.

FIG. 1 is a schematic configuration diagram of an image forming apparatus 11 related to a first embodiment of the present invention. In the first embodiment, the image forming apparatus 11 is applied to an optical printer. FIG. 2 shows a schematic configuration diagram of an LED print head 13, which is the optical write-in head used in the optical printer 11. FIG. 3 shows the LED print head and its image forming actions.

As shown in FIG. 1, the optical printer 11 comprises a cylindrical photosensitive drum 12, the LED print head 13, a charging device 14, a developing device 15, a transferring device 16, a fixing device 17, an erasing lamp 18, a cleaning device 19, a cassette 20, and a stacker 21.

On the surface (photosensitive surface) of the photosensitive drum 12, a photosensitive substance having photoconductivity such as, for example, amorphous silicon is formed. The photosensitive drum 12 rotates at a printing speed. The photosensitive surface of the photosensitive drum 12 is charged with electricity by the charging device 14 when the photosensitive drum 14 is rotating. The LED print head 13 applies light of a dot image to be printed onto the photosensitive surface of the photosensitive drum 12 to thereby neutralize a charged portion where the light is applied. Then, corresponding to a charged condition on the photosensitive surface, toner is applied to the photosensitive surface by the developing device 15.

Next, the transferring device 16 transfers the toner onto a form 22 conveyed from the cassette 20. The form 22 is heated at the fixing device 17 for fixation of the toner and then sent to the stacker 21. When the transferring is finished, the charged photosensitive drum 12 is neutralized throughout the surface, residual toner on which is then removed by the cleaning device 19.

As shown in FIG. 2, the LED print head 13 includes an LED array 23 consisting of a plurality of LEDs each selectively emitting light corresponding to image information and a rod lens array 24, which is an erected equal-magnification image formation lens.

The LED array 23 includes an LED array chip and an IC driver chip which are provided on a substrate. The array elements of the LED array 23 are each turned ON/OFF corresponding to the printing information (image information), which is a serial signal, for example. The light emitted from each of the array elements (light emitted from the object surface in FIG. 3) is focused through each of rod lenses 25, so that an image consisting of many dot images is formed on the photosensitive surface (image surface in FIG. 3) of the photosensitive drum 12. Each of the dot images is formed within a range defined by each of the rod lens 25. The arranging pitch (pitch between emitted light points) of the LEDs of the LED array 23 is 21 $\mu$m at a recording density of 1200 dpi (24 lp/mm), so that the dot-image pitch is also 21 $\mu$m at the recording density of 1200 dpi.

In the first embodiment, as shown in FIGS. 2 and 3, the rod lens array 24 includes a plurality of gradient index rod lenses 25 arranged in two rows between two frames 26. The gradient index rod lenses 25 each have an refractive-index distribution in a radial direction.

The following will describe the conditions (characteristics) of the rod lens array related to the first embodiment with reference to FIGS. 4 to 8.

Figure 4:
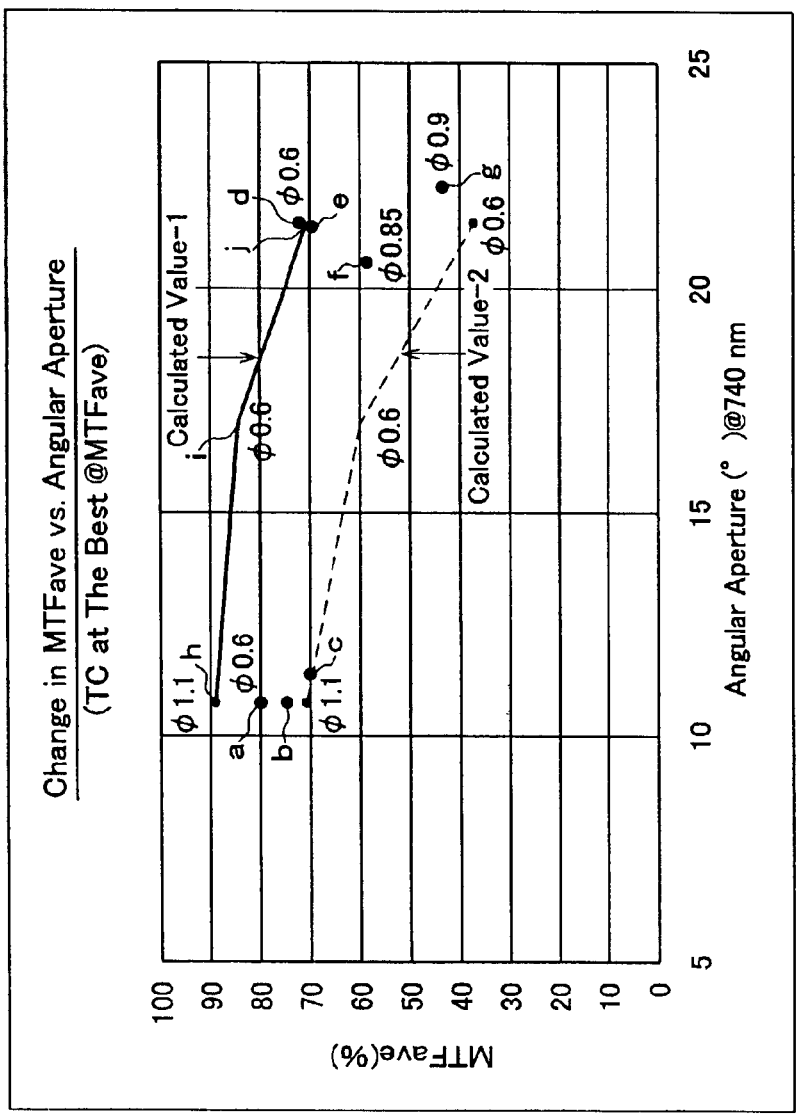
FIG. 4 is a graph for showing a change in resolution (MTFave) ascribed to an angular aperture of a two-row rod lens array.

Condition 1: FIG. 4 indicates the average of a resolution MTF (%) of the lens element that can be attained with respect to an angular aperture θ (°) of the lens element when the emitted-light's intermediate wavelength of the LED array 23 is 740 nm in the rod lens array (two-row rod lens array) including lens elements arranged in two rows. MTF (Modulation Transfer Function) is used to indicate the resolution of the lens. When a rectangular lattice pattern is focused through the rod lens array, MTF is defined in accordance with a strength distribution of the image along the longitudinal direction of the lens array by an equation of MTF=(i(W)max−i(W)min)/(i(W)max+i(W)min)×100 (%), where a maximum and a minimum of the light amount of an image are i(W)max and i(W)min, and spatial frequency is W(lp/mm). The greater MTF, the higher resolution is. As i(W)max and i(W)min are dependent on the position of the lens array, MTFave is used as a parameter of the resolution in the first embodiment. MTFave is the average of a resolution MTF of the entire rod lens array.

In FIG. 4, (A) calculation value 1 indicates a calculated value of MTFave relative to an ideal refractive-index distribution in the case of printing at a recording density of 600 dpi (12 lp/mm). Points h, i, and j indicate calculated values at φ is 1.1, 0.6, and 0.6 respectively. (B) calculation value 2 indicates a calculated value of MTFave relative to the ideal refractive-index distribution in the case of printing at a recording density of 1200 dpi (24 lp/mm). (C) plot (points a to g) all indicates an actual measured value of MTFave in the case of printing at a recording density of 600 dpi.

The lens element, if it is to be used in an LED print head having a recording density of 1200 dpi (24 lp/mm), needs to have an MTFave value of at least 50%. For this purpose, as indicated by (B) calculation value 2 given in a broken line in the figure, the lens element must have an angular aperture θ of about 18° or less. In other words, in the case of printing at a recording density of 1200 dpi (24 lp/mm), if a lens element with an angular aperture θ larger than about 18°, the attainable MTFave level is less than 50%, so that a resolution of 1200 dpi cannot be obtained.

Condition 2: In all of the cases (A), (B), and (C) shown in FIG. 4, the reason why the attainable MTFave level increases as the angular aperture θ decreases is that the curvature of field that can be attained by the lens element decreases as the angular aperture φ decreases. The curvature of field of the lens element not only deteriorates the MTFave level but also gives rise to fluctuations in MTF in a period of a lens radius/diameter (periodic fluctuations in MTF) when the lens elements are arrayed. FIG. 5A shows an actual measurement example of an MTFave profile of the rod lens array 24 in which the lens elements having a lens element diameter φ of 0.6 mm and an angular aperture θ of 22° are arrayed in two rows. FIG. 5B shows an actual measurement example of the MTFave profile of the rod lens array 24 in which the lens elements having a lens element diameter φ of 0.6 mm and an angular aperture θ of 17° are arrayed in two rows. In FIGS. 5A and 5B, the horizontal axis indicates the position of the rod lens array 24 in a direction in which the lens elements are arranged.

FIG. 5A exhibits a periodic MTF fluctuation (MTFmax−MTFmin) of about 12 to 13%, while FIG. 5B exhibits a periodic MTF fluctuation of about 7 to 8%. As a result of testing printing, it was found that a periodic stripe tends to appear in an image if the periodic MTF fluctuation exceeds 10%. To suppress the appearance of the periodic stripe, it is necessary to set the angular aperture θ of the lens elements down to about 18° or less. That is, as can be seen from FIGS. 5A and 5B, it is known that the periodic MTF fluctuation increases as the angular aperture θ increases in excess of 17°. Furthermore, to suppress the periodic MTF fluctuation down to 10% or less, it is necessary to set the angular aperture θ down to about 18° or less.

Figure 6:
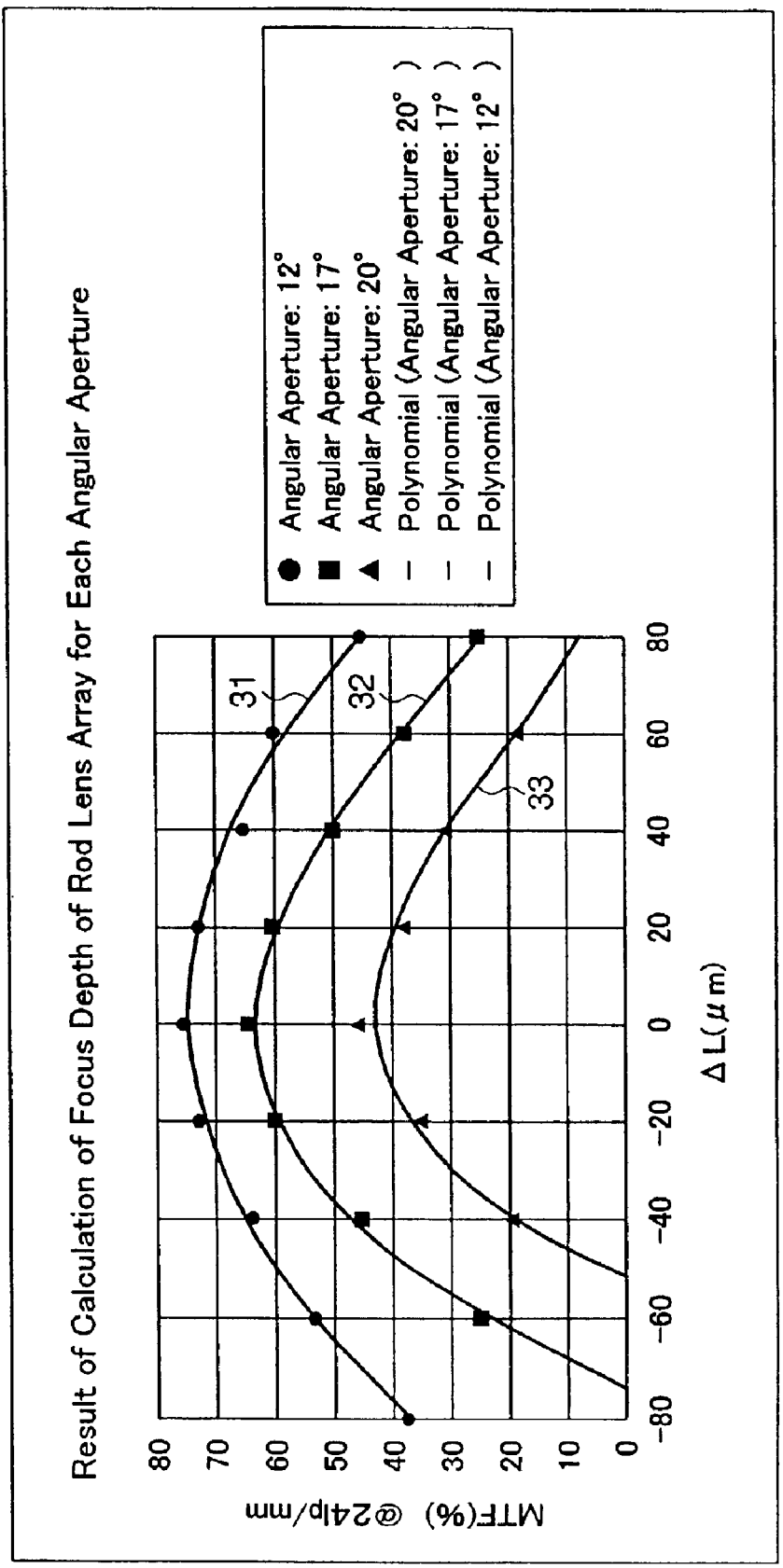
FIG. 6 is a graph for showing a result of calculation of a focus depth of a plurality of types of two-row rod lens array with different angular apertures.

Condition 3: FIG. 6 shows a result of calculation of a focus depth of a plurality of types of rod lens array composed of lens elements having different angular apertures. In FIG. 6, a solid circle, a solid square, and a solid triangle indicate a result of calculation of the focus depth when the angular aperture is 12°, 17°, and 20° respectively. Solid lines 31, 32, and 33 are approximate curves by use of polynomial indicating the calculation results for these angular apertures respectively.

An actually tolerable drop in MTF caused by a defocus of about ±20 μm which is considered to be inevitable due to an attachment error and eccentricity of the photosensitive drum is approximately 5%. FIG. 6 shows that the angular aperture θ of the lens elements must be 18° or less in order to limit the drop in MTF caused by the defocus of about ±20 μm down to about 5% or less. When the angular aperture θ is 17°, a drop in resolution value of MTF caused by the defocus of about ±20 μm which is inevitable due to the attachment error etc. is approximately 4%. This tells that when the angular aperture θ is approximately 18°, such a focus depth can be obtained that the drop in resolution of MTF caused by the defocus of about ±20 μm may be approximately 5%.

Figure 7:
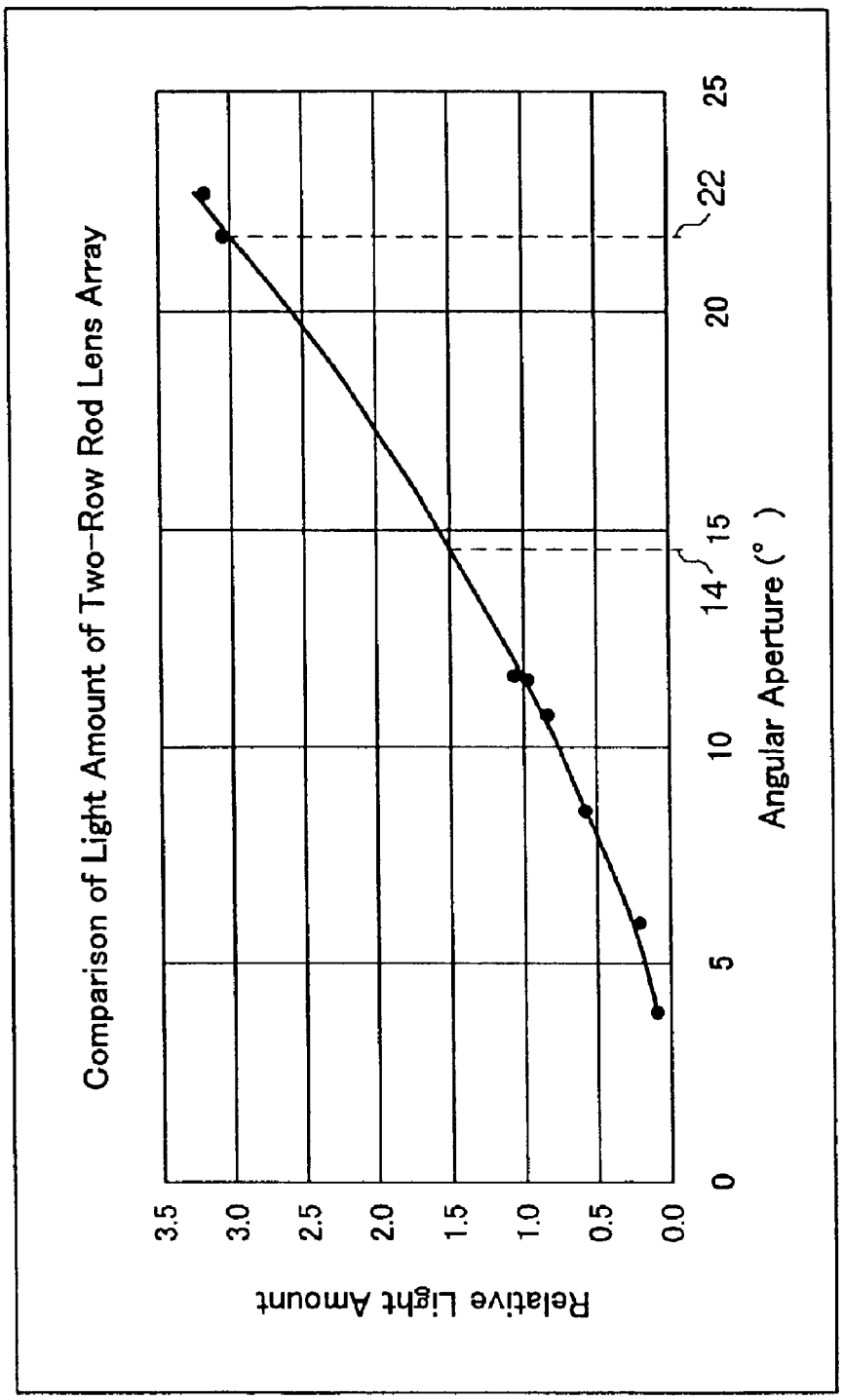
FIG. 7 is a graph for showing a comparison between a light amount and a variety of angular apertures of the two-row rod lens array.

Condition 4: FIG. 7 shows a comparison between a light amount and a variety of angular apertures of the two-row rod lens array. In FIG. 7, the light amount of the rod lens array 24 in which lens elements each having an angular aperture of about 12° is assumed to be "1.0", with respect to which a relative light amount of this two-row rod lens array is indicated against a variety of angular apertures. A level that can be covered up to which the light amount of the LED array 23 can be increased is about half (½) the light amount (about 3.0 as relative light amount) of the two-row rod lens array having an angular aperture of 22°. FIG. 7 indicates that for this purpose the angular aperture of the lens element must be about 14°.

Figure 8:
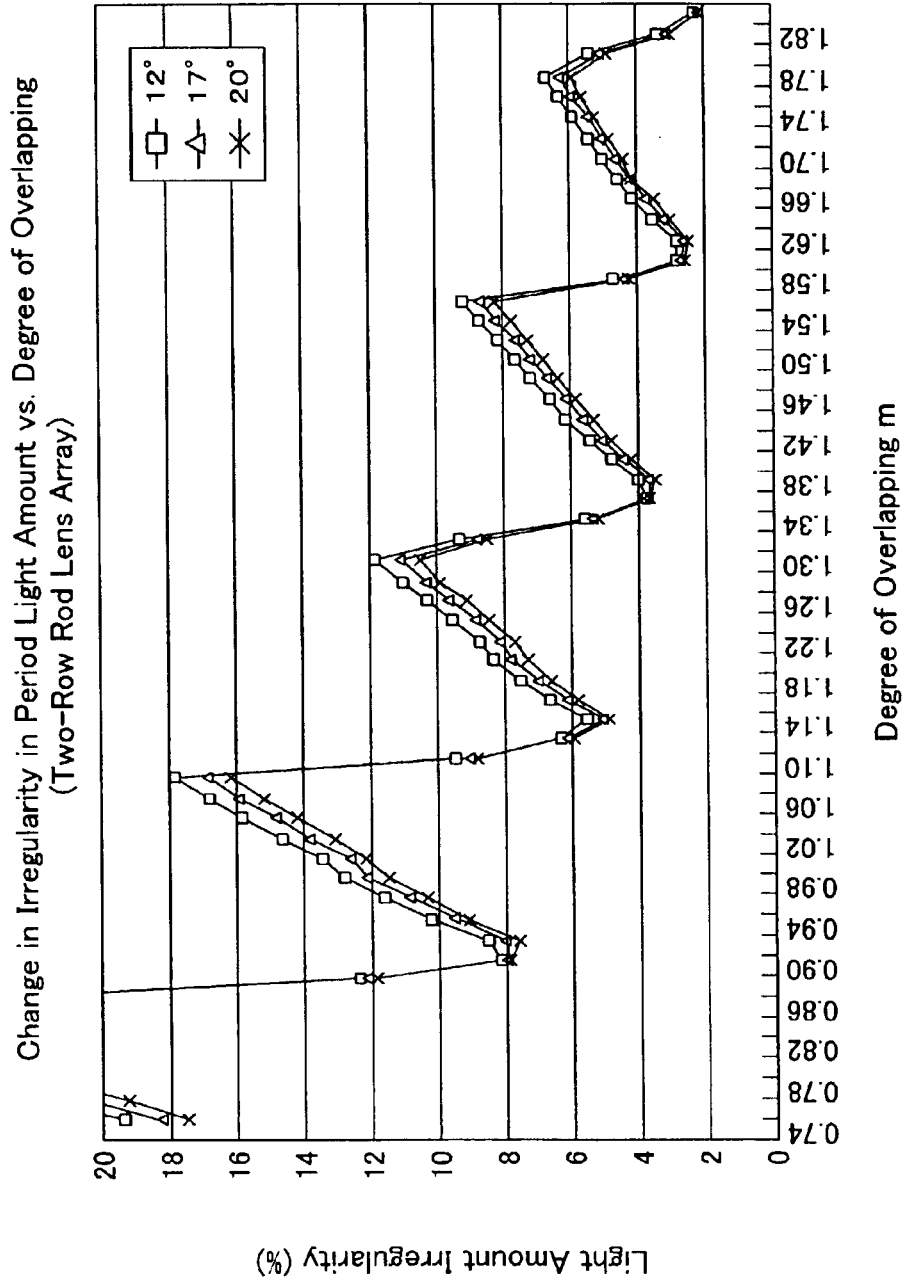
FIG. 8 is a graph for showing irregularities in periodic light amount caused by a degree of overlapping in the two-row rod lens array.

Condition 5: FIG. 8 shows an irregularity in periodic light amount caused by a degree of overlapping in the two-row rod lens array. A conjugate length TC of the rod lens array 24 desirable to downsize it is about 20 mm or less. If an operating length L of the rod lens array 24 is too small, a space cannot easily be preserved around the photosensitive drum 12, thus causing toner to stick to the lens surface of the lens element. To guard against it, the operating length needs to be at least approximately 2 mm.

If the irregularity in periodic light amount of the two-row rod lens array greatly exceeds 10%, heavy load is inflicted on a light amount correction circuit for correcting the periodic light amount irregularity, so that the degree of overlapping m needs to be set to a large value to some extent. If the degree of overlapping m is too large, it gives a disadvantage in terms of resolution and light amount. An appropriate value of the degree of overlapping m is in a range of about 1.10 to 2.00. FIG. 8 shows that preferably the appropriate degree of overlapping m is set at about 1.10 or higher so that the period light amount irregularity may not greatly exceed 10%.

Next, such an effective diameter d of the lens elements as to satisfy the conditions 1 to 5 is obtained as follows (see FIG. 3).

It is assumed here that as the optical parameters of the lens elements (rod lens 25) the refractive index along optical axis is n, the index-distribution constant is $A^{1/2}$, the one-period (light snaking period) is p, the angular aperture is θ, the effective radius is r, and the effective diameter is d. It is also assumed that as the optical parameters of the rod lens array 24, the lens length is Z, the operating length is L, the conjugate length is TC, the lens-element array period is D, and the filling ratio is α (=d/D).

Then, the angular aperture θ is expressed by the following Equation 1:

$$\theta = n * A^{1/2} * r \qquad \text{Eq. 1}$$

The operating length L is expressed by the following Equation 2:

$$= -1/n/A^{1/2} * \tan(Z\pi/p) \qquad \text{Eq. 2}$$

The degree of overlapping m is expressed by the following Equation 3:

$$m = -\alpha/2/\cos(Z\pi/p) \qquad \text{Eq. 3}$$

Equations 2 and 3 are combined to give $(n \cdot A^{1/2} \cdot L)^2 + 1 = (2m/\alpha)^2$. By substituting n of Equation 1 into this equation, the following Equation 4 can be obtained:

$$L = r/\theta * \sqrt{(4m^2/\alpha^2 - 1)} \qquad \text{Eq. 4}$$

From Equation 3, the following Equation 5 can be obtained:

$$Z = p/\pi * \cos^{-1}(-\alpha/2/m) \qquad \text{Eq. 5}$$
$$= 2 \cdot n \cdot r/\theta * \cos^{-1}(-\alpha/2/m)$$

By substituting Equations 4 and 5 into TC=Z+2L, the following Equation 6 is obtained:

$$TC = d/\theta * \{n \cdot \cos^{-1}(-\alpha/2/m) + \sqrt{(4\, m^2/\alpha^2 - 1)}\} \qquad \text{Eq. 6}$$

By substituting Equations 4 and 6 into 2≦L and TC≦20, a range of the effective diameter d of the relevant lens element is given by the following Equation 7. Note here that θ=7π/90 through π/10 rad (14 to 18°) and 1.10≦m≦2.00.

$$4\theta/\sqrt{(4\, m^2/\alpha^2 - 1)} \leq d \leq 20\theta/\{n \cdot \cos^{-1}(-\alpha/2/m) + \sqrt{(4\, m^2/\alpha^2 - 1)}\} \qquad \text{Eq. 7}$$

Condition 6: It is considered that setting of the lens element arranging accuracy must allow for a shift in angle of about 0.5 mrad. Preferably an allowable defocus in image position caused by an inaccurate array of the lens elements is at most ½ of the array pitch of the array elements of the LED array 23. The corresponding conjugate length TC with the recording density being 1200 dpi is as follows:

$$TC \leq (25.4/1200)/2/\tan(0.5/1000) = 21.2$$

The thus obtained TC range is based on condition 5 that the conjugate length TC be about 20 mm or less.

In the first embodiment, the angular aperture θ of each of the rod lenses 25 of the LED print head 13 is set at 14 to 18°, the degree of overlapping m of the rod lenses is set at 1.10≦m≦2.00, and the range of the effective diameter d of each of the rod lenses 25 is set at a value obtained by Equation 7.

Accordingly, the LED print head 13 of the first embodiment has the following advantages.

(1) Since the upper limit of the angular aperture θ of each of the rod lenses 25 is set at about 18°, there is obtained such a resolution (MTFave) of 50% or higher as to be required in printing at a recording density of 1200 dpi (see FIG. 4). As a result, a clear image without a stripe is obtained even in printing at a high recording density of 1200 dpi.

(2) Since the upper limit of the angular aperture θ is set at about 18°, a periodic fluctuation (periodic MTF fluctuation) of the resolution is reduced to about 10% or less, thus enabling suppressing an occurrence of a period stripe appearing in the image (see FIGS. 5A and 5B).

(3) Since the upper limit of the angular aperture θ is set at about 18°, there is obtained such a relatively small focus depth that a drop in resolution caused by an inevitable defocus of about ±20 μm may be reduced to about 5% (see FIG. 6). As a result, a clear image without a stripe is obtained.

(4) Since the lower limit of the angular aperture θ is set at about 14°, it is possible to preserve half a light amount transfer ratio of the rod lens array including the lens elements having an angular aperture of 22° (see FIG. 7). Accordingly, load can be reduced which is inflicted on the amount of light emitted from the LED array 23 and the sensitivity of the photosensitive substance. As a result, the necessity of a full-scale cooling mechanism can be eliminated.

(5) Since the conjugate length TC is small, it has an insignificant influence on an inclination of the array of the rod lenses 25, so that a local stripe-like irregularity appears scarcely. Furthermore, the LED print head 13 can be downsized.

(6) Since the lower limit of the degree of overlapping m of the rod lens array 24 is set at about 1.10, the periodic light amount irregularity of the rod lens array 24 is reduced to about 10% or less (see FIG. 8). Accordingly, load is reduced which is inflicted on the light amount correction circuit for correcting periodic irregularities in light amount.

(7) Since the upper limit of the degree of overlapping m is set at about 2.00, there are preserved an appropriate resolution and an appropriate amount of light transferred to the photosensitive substance.

(8) In the present LED print head 13, such a rod lens array 24 is used that the range of the effective diameter d of each of the lens elements thereof is obtained by Equation 7 on the assumption that the operating length L is 2≦L and the conjugate length TC is TC≦20. Accordingly, it is possible to preserve a space around the photosensitive drum 12 and also to suppress an occurrence of a trouble that toner would stick to the lens elements.

The following will describe the rod lens array 24 according to other embodiments of the present invention. The rod lens array 24 is used in the LED print head 13 of the optical printer shown in FIG. 1 and includes a plurality of the gradient index rod lenses (hereinafter simply called rod lenses) 25.

To obtain a good picture quality free of stripe-like irregularities with the optical printer using the plurality of small-sized rod lenses 25, preferably the performance of the lenses is constant everywhere in the range in which an image is formed. The rod lens array 24 includes many rod lenses 25, so that its optical performance fluctuates periodically. Since this fluctuation occurs uniformly all over the image forming range, it does not always cause deterioration in picture quality depending on its period or amplitude. If, however, an influence of such irregularity in performance of each of the rod lenses 25 gives rise to a partial fluctuation, a high-resolution printer having a recording density of 600 dpi or higher, in particular, encounters a stripe-like irregularity (irregularity in image color density) due to the partial fluctuation in optical performance of the lens array. As a result, the high-resolution printer with a recording density of 600 dpi or higher, etc. must use such a rod lens array 24 as to encounter no partial fluctuation in optical performance.

Accordingly, the rod lens array 24 related to the following embodiments is manufactured in such a manner that it may satisfy one of the following conditions 1A to 9A. Values (evaluation item values) given in each of the following conditions are set for the 1200 dpi-specification rod lens array 24 used in a 1200 dpi-specification LED array 23.

Condition 1A: The partial MTF (contrast) fluctuation must be about 18% or less, which is a difference between an average and a minimum of the dot image contrasts in each of sections (which measures 10 mm in length) into which the image forming range is sub-divided so that they may have an arbitrary width (for example, about 10 mm).

Condition 2A: The partial MTF max-min must be about 30% or less, which is a difference between a maximum and a minimum of the dot image contrasts in each of the sections (which measures 5 mm) into which the image forming range is divided so that they may have an arbitrary width (for example, about 5 mm).

Condition 3A: The sectional MTF average difference must be about 10% or less, which is a difference between an average of the dot image contrasts in each of the sections (which measures 1 mm) into which the image forming range is divided so that they may have an arbitrary width (for example, about 1 mm) and that in the adjoining section (which measures 1 mm).

Condition 4A: The standard deviation of the dot image contrasts all over the image forming range must be about 5% or less. If, for example, five dot images have contrasts of 50%, 45%, 48%, 52%, and 55% respectively, the standard deviation of the dot image contrasts is expressed as 3.81%.

Condition 5A: The standard deviation of the dot image contrasts all over the image forming range must be about 12% or less with respect to an average of the dot image contrasts all over the image forming range. If, for example, a value of the average is 50% and the corresponding standard deviation value is 5%, the ratio therebetween is expressed as 5/50=0.1, that is, 10%.

Condition 6A: The fluctuation in lens element diameter of the rod lenses 25 of the rod lens array 24 must be an average lens element diameter ±0.5% or less approximately. The term "lens element diameter" refers to the effective diameter d of each of the rod lenses 25.

Condition 7A: The fluctuation in light snaking period (pitch) of the rod lenses 25 is an average period ±0.25% or less approximately.

Condition 8A: Assuming that the arranging pitch of the array elements of the LED array 23 actually used in the LED print head 13 is P and the spacing between the LED array 23 and the photosensitive drum 12 is the conjugate length TC, the lens element array parallelism must be about P/TC or less. The term "lens element array parallelism" refers to a maximum among the angles between the optical axes of the adjoining rod lenses 25.

Condition 9A: The fluctuation in angle of the optical axes of the rod lens arrays 24 with respect to a lens array attaching reference surface to which the outer surface of the frame 26 of each of the rod lens arrays 24 is fixed must be within about ±0.02/TC [mm] (unit: radian).

Figure 9:
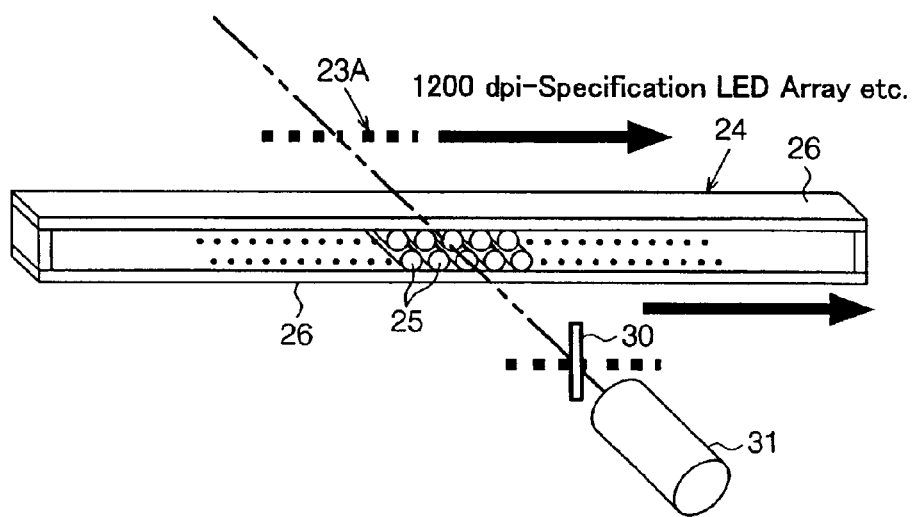
FIG. 9 is an illustration for explaining a method for measuring a contrast (MTF) of a dot image.

The "dot image contrast" used in conditions 1A to 9A is obtained by, for example, a measurement method shown in FIG. 9. By the measurement method, first, as shown in FIG. 9, a dot light source array (for example, LED array) 23A is placed at a position which is conjugate with one slit 30 with respect to the rod lens array 24. Behind the slit 30, a light receiving element 31 is positioned. A light receiving unit comprises the slit 30 and the light receiving element 31. In the dot light source array 23A, the size of its light emitting dot is, for example, 15 μm×15 μm and the spacing therebetween is about 42 μm (which is equal to a spacing between every second lit array element in the 1200 dpi-specification LED array in which the array elements are arranged at a pitch of about 21 μm). By lighting up every light emitting dots of the dot light source array 23A, the same light emitting pattern can be obtained as that when the dot light source arrays are arranged and lit at a spacing of about 42 μm therebetween all over the effective width of the lens array.

In a condition where the dot light source array 23A is lit, the dot light source 23A and the rod lens array 24 are moved in the direction in which the lenses of the lens array 24 are arranged (which is indicated by an arrow in FIG. 9). As a result, a light amount of all the dot images focused by the rod lens array 24 at the slit 30 is detected by the light receiving element 31 sequentially.

The light amount thus detected corresponds to that of every dot image focused by the rod lens array 24 on the photosensitive surface of the photosensitive drum 12 in the image forming range. The "image forming range" takes one line of area of an image formed on the photosensitive surface of the photosensitive drum 12. The image forming range is determined by the effective width of the rod lens array 24.

Assuming that the maximum and minimum values of the light amount, which is detected of each of the dot images in the image forming range, of the n'th dot image in it are Imax and Imin respectively, the contrast (MTF_n) of the n'th dot image is defined as follows:

$$MTF\_n = (Imax\_n - Imin\_n)/(Imax\_n + Imin\_n) \times 100(\%) \qquad \text{Eq. 8}$$

The "contrast of each dot image" is obtained for all of the dots in the image forming range. Then, a contrast distribution of all the dot images of the rod lens array 24 is obtained. The dot image contrast distribution is one factor for expressing the resolution of the electro-photographic optical printer 11.

Figure 11:
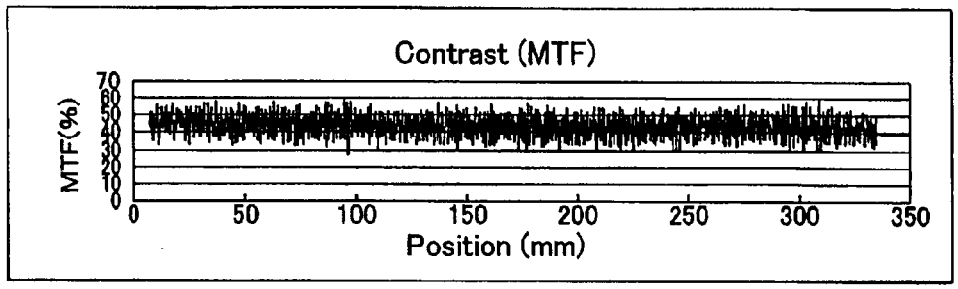
FIG. 11 is a graph for showing a distribution of the contrast (MTF) of the rod lens array related to a second embodiment.
Figure 12:
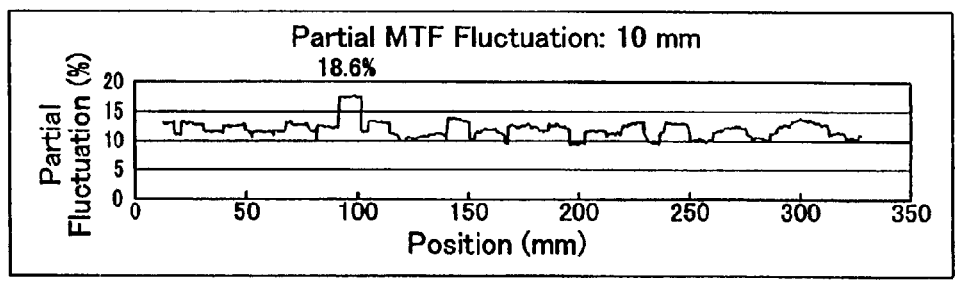
FIG. 12 is a graph for showing a partial fluctuation of MTF used to explain the rod lens array related to the second embodiment.

A rod lens array 24A of a second embodiment is manufactured in such a manner that it may satisfy condition 1A. FIGS. 11 and 12 are graphs given for the rod lens array of a comparison example according to the second embodiment. FIG. 11 shows a distribution of the contrast (MTF) of the dot images in the image forming range and FIG. 12, a partial MTF fluctuation related to condition 1A.

As can be seen from the distribution of the dot image contrasts (MTF) shown in FIG. 11, in the rod lens array of the comparison example, the contrast value itself does not seem to have a distinct difference from the surroundings all over the image forming range. As shown in FIG. 12, however, the partial MTF fluctuation of the rod lens array of the comparison example is sufficiently smaller than 18% in the 10-mm sections except those near the position 95 mm but, in one 10-mm section near it, is 18.6%. When information was actually printed with the 1200 dpi-specification optical printer 11 using the rod lens array of the comparison example, a wide stripe-like irregularity appeared near the position 95 mm. At the position of the print-out where the wide stripe-like irregularity appeared, a difference was observed in dot size (amount of toner stuck to the surface) from the surroundings. As a result of testing printing with the 1200 dpi-specification optical printer, it was found that as in the case of the comparison example, in such a rod lens array that the partial MTF fluctuation exceeded 18.6% in any of the 10-mm sections thereof, the relevant position in this section encountered a wide stripe-like irregularity.

When information was actually printed with the 1200 dpi-specification optical printer 11 using the rod lens array 24A according to the second embodiment, on the other hand, no wide stripe-like irregularity appeared anywhere on the printed surface. This is because condition 1A was satisfied, so that the partial MTF fluctuation did not exceed 18% in all the 10-mm sections in the image forming range, thus eliminating a factor for forming a dot image (dot) with a distinct color density in any narrow sections (10-mm sections).

By the rod lens array 24A of the second embodiment, therefore, a good picture quality free of a wide stripe-like irregularity can be obtained all over the printed surface when information is printed at a high recording density of 1200 dpi.

Figure 13:
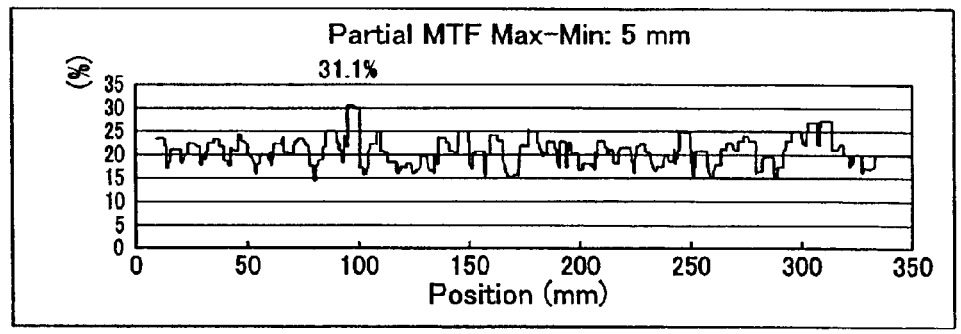
FIG. 13 is a graph for showing a partial MTF max-min used to explain the rod lens array related to a third embodiment.

A rod lens array 24B related to a third embodiment is manufactured in such a manner that it may satisfy condition 2A. FIG. 13 is a graph created for the rod lens array of the comparison example as against that of the third embodiment, showing a partial MTF max-min related to condition 2A. As shown in FIG. 13, the partial MTF max-min of the rod lens array of the comparison example is 31.1%, in excess of 30%, in one narrow section (5-mm section) near the position 95 mm. When information was actually printed with the 1200 dpi-specification optical printer 11 using the rod lens array of the comparison example, a wide stripe-like irregularity appeared near the position 95 mm. As a result of testing printing with the 1200 dpi-specification optical printer 11 using a few rod lens arrays manufactured so as to be different from each other in performance of the rod lens, it was found that in one such rod lens array that the partial MTF max-min exceeded 30& in any of the 5-mm sections thereof, the relevant position in the section with the value in excess of 30% encountered a wide stripe-like irregularity.

When information was actually printed with the 1200 dpi-specification optical printer 11 using the rod lens 24 of the third embodiment, on the other hand, no wide stripe-like irregularity appeared. This is because condition 2B was satisfied, thus eliminating a factor for forming a dot image (dot) with a distinct color density in the narrow section (5-mm section).

By using the rod lens array 24B of the third embodiment, therefore, a good picture quality free of a wide stripe-like irregularity can be obtained all over the printed surface when information is printed at a high recording density of 1200 dpi.

Figure 14:
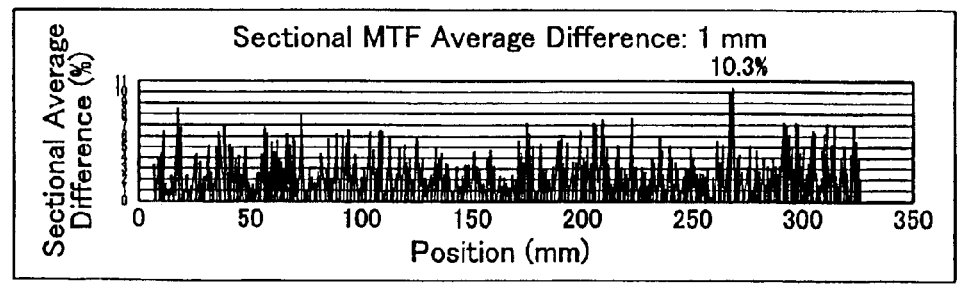
FIG. 14 is a graph for showing a sectional MTF difference used to explain the rod lens array related to a fourth embodiment.

A rod lens array 24C according to a fourth embodiment is manufactured in such a manner that it may satisfy condition 3A. FIG. 14 is a graph created for the rod lens array of the comparison example as against that of the fourth embodiment, showing a sectional MTF average difference related to condition 3A.

As shown in FIG. 14, the sectional MTF average difference of the rod lens array of the comparison example is 10.3% in one narrow section (1-mm section) near the position 275 mm and less than 10% in the other sections. When information was actually printed with the 1200 dpi-specification optical printer 11 using the rod lens array of the comparison example, a narrow stripe-like irregularity appeared near the position 275 mm. The narrow stripe-like irregularity thus appeared because the adjoining net dots had a larger difference in color density therebetween and, therefore, could not formed for representation of gradations as intended.

When the rod lens array 24C of the fourth embodiment was used, on the other hand, no narrow stripe-like irregularity appeared anywhere on the printed surface as a result of testing of printing. This is because condition 3A was satisfied, so that a factor for increasing a difference in color density between the adjoining net dots was eliminated, thus making it difficult for a stripe to appear. This enables avoiding such a phenomenon that a stripe becomes distinct depending on gradations. In other words, it is possible to form a net dot for representation of gradations in an intended manner, thus preventing appearance of stripe-like irregularities, especially narrow stripe-like irregularities, that appear otherwise.

By using the rod lens array 24C related to the fourth embodiment, therefore, a good picture quality free of stripe-like irregularities, especially narrow stripe-like irregularities, can be obtained all over the printed surface when information is printed at a high recording density of 1200 dpi. Especially, such a phenomenon can be avoided that a stripe becomes distinct depending on the gradations.

A rod lens array 24D related to the fifth embodiment is manufactured in such a manner that it may satisfy condition 4A. In the rod lens array 24D of the fifth embodiment that satisfies condition 4A, an average of the dot image contrasts all over the image forming range was 44.2% (see FIG. 11) and a standard deviation thereof, 4.67%.

Printing testing was conducted using a few rod lens arrays. As a result, a narrow stripe-like irregularity was distinct all over the printed surface when the standard deviation of the dot image contrasts exceeded 5% all over the image forming range. When the standard deviation was 5% or less as in the case of using the rod lens array 24D of the fifth embodiment, no narrow stripe-like irregularity appeared anywhere on the printed surface.

By using the rod lens array 24D related to the fifth embodiment, therefore, a good picture quality free of a narrow stripe-like irregularity all over the printed surface can be obtained when information is printed at a high recording density of 1200 dpi.

A rod lens array 24E related to the sixth embodiment is manufactured in such a manner that it may satisfy condition 5A. In the rod lens array 24E of the sixth embodiment, an average of the dot image contrasts all over the image forming range was 44.2% (see FIG. 11) and a standard deviation thereof, 4.67%. In this case, $4.67/44.2 \approx 0.1$ (approximately 10%). The rod lens array 24E satisfies condition 5A.

Printing testing was conducted using a few rod lens arrays. As a result, it was found that a narrow stripe-like irregularity becomes distinct all over the printed surface when the average is small, so that the standard deviation, even if it is small itself, exceeds 12% of the average. When the rod lens array 24 of the sixth embodiment was used, on the other hand, condition 5A was satisfied, no narrow stripe-like irregularity appeared anywhere on the printed surface.

By using the rod lens array 24E related to the sixth embodiment, therefore, a good picture quality free of a narrow stripe-like irregularity can be obtained when information is printed at a high recording density of 1200 dpi.

The following will describe a rod lens array 24F related to a seventh embodiment. As in the case of the rod lens array 24A related to the second embodiment, the seventh embodiment uses the rod lens array 24 in which a number of small-sized gradient index rod lenses are arrayed, which rod lens array 24 is manufactured in such a manner that it may satisfy condition 6A.

In the rod lens array 24, in which such rod lenses are mixed in manufacture as to have a lens-element diameter fluctuation in excess of ±0.5% of the average lens-element diameter, the position corresponding to such rod lenses encounters a section (1-mm section) where a sectional MTF average difference shown in FIG. 14 exceeds 10%. As a result of testing printing using the rod lens array, it was found that a narrow stripe-like irregularity appears at the relevant position on the printed surface.

When the rod lens array 24F of the present embodiment satisfying condition 6A is used, on the other hand, a narrow stripe-like irregularity can be prevented from appearing at the relevant position on the printed surface if the rod lenses 25 of the gradient index rod lens array 24 have a fluctuation in lens element diameter.

The following will describe a rod lens array 24G related to an eighth embodiment. As the seventh embodiment, the eighth embodiment uses a gradient index rod lens array as the array 24G, which is manufactured in such a manner that it may satisfy condition 7A.

In the rod lens array 24, in which such rod lenses 25 are mixed in manufacture as to have a light amount snaking period in excess of an average period ±0.25%, the position corresponding to such rod lenses encounters a section (1-mm section) where a sectional MTF average difference shown in FIG. 14 exceeds 10%. As a result of testing printing using this rod lens array, it was found that a narrow stripe-like irregularity appears at the relevant position on the printed surface.

When the rod lens array 24G of the eighth embodiment satisfying condition 7A is used, on the other hand, a narrow stripe-like irregularity can be prevented from appearing at the relevant position on the printed surface because the sectional MTF average difference is 10% or less if the rod lenses 25 have a fluctuation in light snaking period.

The following will describe a rod lens array 24H related to a ninth embodiment. As in the case of the eighth embodiment, the present embodiment uses a gradient index rod lens array 24H, which is manufactured in such a manner that it may satisfy condition 8A.

As a result of investigation of such a rod lens array that a wide stripe developed and the partial MTF fluctuation exceeded 18% and the partial MTF max-min exceeded 30%, it was found that the optical axes of the rod lenses thereof each have an angle of about 0.002 (radian) with respect to the adjoining rod lens at the relevant position. The rod lens array is so designed that the spacing between the light source (substance surface) and the image surface (see FIG. 3), that is, the conjugate length TC may be about 10 mm, so that the angle of the optical axis has a shift of about 20 μm on the image surface. This is roughly equal to a pitch between the light emitting dots of the 1200 dpi-specification LED array. When the LED array was transformed into a 600 dpi-specification one, it was found that the tolerable shift in angle of the optical axis is roughly equal to 0.0045 (radian), which is almost double that for the 1200 dpi-specification LED array. From this, it was found that assuming the arrangement pitch between the array elements of the actually assembled LED array to be P, the lens element array parallelism needs to be is roughly P/TC (radian) at the maximum.

By using the rod lens array 24H of the ninth embodiment, it is possible to prevent the appearance of a wide stripe-like irregularity ascribed to a shift in angle of the optical axis between the rod lenses 25. It is, therefore, possible to obtain a good picture quality free of a wide stripe-like irregularity even when many gradient index rod lenses are arranged to constitute the rod lens array 24.

Furthermore, by using the optical printer 11 in which any one of the rod lens arrays 24A to 24H according to the respective second through ninth embodiments is utilized, it is possible to form a good picture-quality image free of a wide stripe-like irregularity and output it when it is printed at a high recording density of 1200 dpi.

The following will describe the optical printer 11 related to a tenth embodiment. The optical printer 11 is capable of outputting a color image.

To obtain a color image using an optical printer, generally at least three colors, for example, yellow, magenta, cyan, and black colors, of images are superposed on each other to form the color image on the photosensitive surface of the photosensitive drum 12. For that purpose, it is necessary to arrange in the optical printer 11 a plurality of (at least three) the LED print heads 13 shown in FIG. 2 in which the LED array 23 and the rod lens array 24 are mounted. In this case, a stripe-like color irregularity due to a shift in color appears unless these colors of images are superposed properly. The stripe-like color irregularity will appear if there is a shift in position at which a dot image is formed by the rod lens arrays 24. The image dots are formed at a pitch of about 21 μm therebetween in the 1200 dpi-specification optical printer, so that if the formation position of the dot images is shifted by the pitch of 21 μm or more, the intended colors cannot be reproduced, thus giving rise to a stripe-like irregularity. It is necessary to reduce the image formation positional shift to about 42 μm or less in the 600 dpi-specification printer.

If process color printing is performed by combining a plurality of LED print heads 13 including a rod lens array capable of obtaining a good picture quality with a single color, a stripe-like color irregularity may sometimes appear due to a color shift. As a result of discussion on the stripe-like color irregularity due to a color shift, it was found that each color of the dot image has a shift of about 20 μm despite a small fluctuation in dot image size (dot size). As an investigation of the relevant portion of the rod lens array 24, it was found that the lens surface of the rod lens 25 is shifted by about ±0.02/TC [mm] (unit: radian) despite that it must be at 90° with respect to the lens array attachment reference surface of the rod lens array 24.

In calculation of a shift in angle which contributes to the inclination of the optical axis of the rod lens array 25, the inventor took into account the refraction of incident light from the LED array 23 at the lens surface of the rod lens 25 and came up with a finding that the shift in angle roughly agrees with a shift in position of the dot image (shift in image formation position). From this, it was found that it is necessary to reduce a fluctuation in angle between the lens surface of the rod lens 25 and the array attachment reference surface to about ±0.02/TC [mm] (unit: radian) or less.

As the rod lens array of the above-mentioned embodiments, the optical printer 11 of the tenth embodiment also comprises a plurality of (at least three) rod lens arrays 24 capable of obtaining a good picture quality free of a stripe-like irregularity. The fluctuation in angle of the optical axis of each of the rod lens arrays 24 with respect to the lens array attachment reference surface to which the outer surface of the frame 26 of each of the rod lens arrays 24 is set at about ±0.02/TC [mm] (unit: radian) or less.

In the optical printer 11 related to the tenth embodiment, the plurality of rod lens arrays 24 are each assembled to the lens array attachment reference surface as adjusted to satisfy condition 9A. Accordingly, the rod lens arrays with a large fluctuation in position of the printing point are adjusted beforehand, so that the fluctuation in angle between the frame 26 of each of the rod lens arrays and the rod array attachment reference surface is reduced to about ±0.02/TC

[mm] (unit: radian) or less. This enables preventing a stripe-like irregularity from appearing due to a color shift when performing process color printing using a plurality of lens arrays.

[Method for Inspecting Optical Printer 11]

Figure 10:
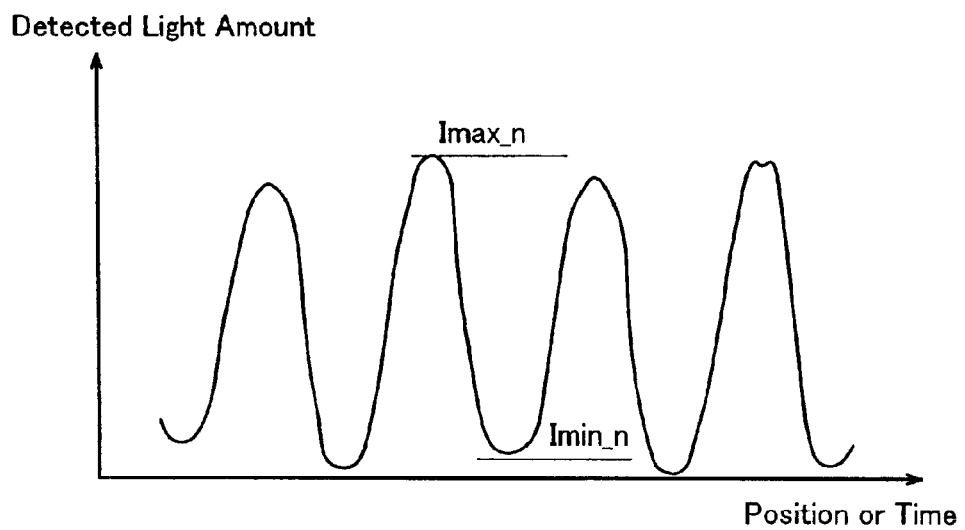
FIG. 10 is a graph for showing a light amount of each dot image detected by the measuring method in FIG. 9.

The following will describe first through third methods for inspecting the optical printer 11 with reference to FIGS. 9 and 10.

[First Inspection Method]

The first inspection method comprises the following five steps:

(Step 1): The dot light source 23A is disposed at a position conjugated with one slot 30 with respect to the rod lens array 24 and, behind the slit 30 is disposed the light receiving element 31 (see FIG. 9).

(Step 2): By lighting up all the dot light sources of the dot light source array (which has a light emitting dot size of 15 $\mu$m×15 $\mu$m and a spacing of about 42 $\mu$m between the light emitting dots) 23A, light is emitted through a uniform light emitting pattern all over the effective width of the rod lens array 24.

(Step 3): The dot light source array 23A and the rod lens array 24 are moved toward the slit 30 in a direction in which the lenses of the lens array 24 are arranged (arrow direction in FIG. 9), to detect by the light receiving element 31 an amount of light from each of the dot images interconnected by the rod lens array.

(Step 4): The contrast of the all of the dot images in the image forming range is obtained. The "contrast of dot image" is obtained by Equation 8.

(Step 5): it is decided whether the partial MTF fluctuation, which is a difference in an average and a minimum Imin of the contrast values of the dot images, in each of the sections (10-mm sections) with a predetermined width obtained by dividing the image forming range is roughly 18% or less.

The first inspection method for the optical printer 11 has the following advantages.

A judgment result can be obtained in step 5 on whether the partial MTF fluctuation in each section is roughly 18% or less, thus deciding whether a good picture quality free of a stripe-like irregularity ascribed to the rod lens array 24 can be obtained before the apparatus is assembled. The stripe-like irregularity ascribed to the rod lens array 24 can be checked before the assembly of the apparatus. The performance of the rod lens array 24 itself can be evaluated without conducting printing testing actually. Accordingly, it is possible to simplify the inspection process itself for the apparatus after being assembled and also to know a fault of the rod lens array 24 itself after the assembly of the apparatus. It is, therefore, possible to check the stripe-like irregularity ascribed to the rod lens array 24 before the apparatus is assembled, thus improving the productivity.

[Second Inspection Method]

The second inspection method for the optical printer 11 has changed only step 5 of steps 1 to 5 of the first inspection method. The second inspection method comprises the above-mentioned steps 1 to 4 and the following step 6.

{Step 6}: It is decided whether the partial MTF max-min, which is a difference between the maximum Imax and the minimum Imin of the contrasts of the dot images, in each of the sections (5-mm sections) with a predetermined width obtained by dividing the image forming range is roughly 30% or less.

The second optical printer inspection method has the following advantages.

In step 6 a result can be obtained on whether the partial MTF max-min in each 5-mm section is roughly 30% or less, thus deciding whether a good picture quality free of a stripe-like irregularity ascribed to the rod lens array 24 can be obtained before the apparatus is assembled. It is, therefore, possible to check the stripe-like irregularity ascribed to the rod lens array 24 before the apparatus is assembled, thus improving the productivity.

[Third Inspection Method]

The third inspection method for the optical printer 11 has changed only step 5 of steps 1 to 5 of the first inspection method. The third inspection method comprises the above-mentioned steps 1 to 4 and the following step 7.

{Step 7}: It is decided whether the sectional MTF average difference, which is a difference between an average of the contrasts of the dot images in each of the sections (1-mm sections) with a predetermined width obtained by dividing the image forming range and that in the adjoining section, is roughly 10% or less.

The third optical printer inspection method has the following advantages.

In step 7 a result can be obtained on whether the sectional MTF average difference in each 1-mm section is roughly 10% or less, thus deciding whether a good picture quality free of a stripe-like irregularity ascribed to the rod lens array 24 can be obtained before the apparatus is assembled. It is, therefore, possible to check the stripe-like irregularity ascribed to the rod lens array 24 before the apparatus is assembled, thus improving the productivity.

It should be apparent to those skilled in the art that the present invention may be embodied in many other specific forms without departing from the spirit or scope of the invention. Particularly, it should be understood that the invention may be embodied in the following forms.

In the first embodiment, the rod lens array 24 may comprise a number of plastic rod lenses arranged therein.

In the second embodiment, the rod lens array 24A may satisfy conditions 1A and 4A or conditions 1A and 5A.

In the third embodiment, the rod lens array 24B may satisfy conditions 2A and 4A or conditions 2A and 5A.

In the fourth embodiment, the rod lens array 24C may satisfy conditions 3A and 4A or conditions 3A and 5A.

The present invention is applicable to such a rod lens array as to satisfy all of conditions 1A to 5A.

In the seventh embodiment, the rod lens array 24F may satisfy conditions 6A and 7A, conditions 6A and 8A, or conditions 6A, 7A, and 8A.

In the ninth embodiment, the optical printer 11 may be of such a type that four photosensitive drums thereof are used to form images of various colors respectively, which are then superposed on each other.

In the second through tenth embodiments, the arranging spacing between the dot light source arrays is not limited to 42 $\mu$m.

In the second through tenth embodiments, the number of the arranged rod lens arrays may be one or three or more.

In the second through tenth embodiments, the erected equal-magnification image forming lens array may comprise, for example, typical erected equal-magnification image forming lenses or index-distribution flat-plate micro-lenses arranged in one or a plurality of rows.

In the second through tenth embodiments, the items (evaluation items) given in conditions 1A to 9A are set at respective different values for a rod lens array used in an LED array suitable for use in printing at a recording density of 600 dpi or higher.

In each of the embodiments, the light source array of the rod lens array 24 only needs to be able to turn ON/OFF each of the light source elements in illumination or to be able to transmit/block light from an external light source for each of the picture elements. For example, it may be a light shutter array including an external light source (back-light source) such as a discharge tube and an LCD shutter array which transmits/blocks light from the back-light source corresponding to image information.

In each of the embodiments, the optical printer 11 may be an LCD shutter printer using an optical write-in head including an LCD shutter array and a rod lens array 24 or any other equal-magnification image forming lens.

In the first optical printer inspection method, it may be decided whether conditions 1A and 4A or conditions 1A and 5A are satisfied.

In the second optical printer inspection method, it may be decided whether conditions 2A and 4A or conditions 2A and 5A are satisfied.

In the third optical printer inspection method, it may be decided whether conditions 3A and 4A or conditions 3A and 5A are satisfied.

The present invention is applicable to any other devices than an optical printer. For example, the present invention can be applied to a copy machine provided with the LED print head 13, a composite machine provided with a printer function and a facsimile function, etc.

Therefore, the present examples and embodiments are to be considered as illustrative and not restrictive and the invention is not to be limited to the details given herein, but may be modified within the scope and equivalence of the appended claims.

What is claimed is:

1. An optical write-in head for applying light carrying image information to a photosensitive substance, comprising:
   an array light source having a plurality of dot light sources, each of which selectively emits the light corresponding to the image information; and
   a lens array facing the array light source, wherein the lens array has a plurality of lens elements which corresponds to the plurality of dot light sources respectively, wherein an angular aperture θ of each of the lens elements is set in a range of about 14° to 18°.

2. The optical write-in head according to claim 1, wherein a degree of overlapping of the lens elements is set in a range of about 1.10 to 2.00.

3. The optical write-in head according to claim 1, wherein the angular aperture θ of each of the lens elements is set such that the average of a resolution MTF of the entire lens array is about 50% or more.

4. The optical write-in head according to claim 1, wherein the angular aperture θ of each of the lens elements is set such that a period fluctuation of the resolution of the lens array is about 10% or less.

5. The optical write-in head according to claim 1, wherein the angular aperture θ of each of the lens elements is set such that a focus depth is obtained to control a drop in resolution at approximately 5% caused by a defocus of about ±20 μm due to an attachment error and eccentricity of the photosensitive substance.

6. The optical write-in head according to claim 1, wherein the angular aperture θ of each of the lens elements is set such that a minimum required level of transmitted light amount can be obtained by an increase in a light amount from the array light source to accommodate a shortage in amount of light transmitted through the lens array.

7. The optical write-in head according to claim 1, wherein:
   a conjugate length of the lens array is set about 20 mm or less, and
   an operating length of the lens array is set about 2 mm or more.

8. The optical write-in head according to claim 1, wherein:
   each of the lens elements is a gradient index rod lens; and
   the lens array contains two rows of gradient index rod lens arrays.

9. The optical write-in head according to claim 1, wherein each of the dot light sources is a light emitting element.

10. The optical write-in head according to claim 1, wherein the array light source includes an optical shutter array and a light source of the shutter array.

11. An optical write-in head for applying light carrying image information to a photosensitive substance, comprising:
   an array light source having a plurality of dot light sources, each of which selectively emits the light corresponding to the image information; and
   a lens array facing the array light source, wherein the lens array has a plurality of lens elements which corresponds to the plurality of dot light sources respectively, wherein:
   an angular aperture θ of each of the lens elements is set in a range of about 14 to 18°;
   a degree of overlapping m of the lens elements is set in a range of about 1.10 to 2.00; and
   an effective diameter d of each of the lens elements is set in a range given by an equation of $4\theta/\sqrt{(4\ m^2/\alpha^2-1)} \leq d \leq 20\theta/(n\cdot\cos^{-1}(-\alpha/2/m)+\sqrt{(4\ m^2/\alpha^2-1)})$, where an optical axial refractive index of each of the lens elements is n, an arranging period of the lens elements of the lens array is D, and a filling ratio of the lens array is α (=d/D).

12. An optical write-in head for applying light carrying image information to a photosensitive substance, comprising:
   an array light source having a plurality of dot light sources, each of which selectively emits the light corresponding to the image information; and
   a lens array facing the array light source, wherein the lens array has a plurality of lens elements which corresponds to the plurality of dot light sources respectively, each of the plurality of lens elements receiving the light from a corresponding one of the dot light sources to focus the light on the photosensitive substance in order to forming a dot image, wherein:
   an image forming range in which the lens array interconnects the dot images is divided at a predetermined width to define a plurality of image forming sections; and
   the lens array has one of the following five characteristics:
   [1] a characteristic that when the dot light sources are each lit, a difference between an average and the minimum of the contrast of the dot images in each of the image forming sections is about 18% or less;
   [2] a characteristic that when the dot light sources are each lit, a difference between the maximum and the minimum of the contrasts of the dot images is about 30% or less in each of the image forming sections;

[3] a characteristic that when the dot light sources are each lit, the difference between the average of the contrasts of the dot image in each of the image forming sections and the average of the contrasts of the dot image in the adjoining image forming section is about 10% or less;

[4] a characteristic that when the dot light sources are each lit, a standard deviation of the contrasts of the dot images all over the image forming range is about 5% or less; and

[5] a characteristic that when the dot light sources are each lit, the standard deviation of the contrasts of the dot images all over the image forming range is about 12% or less of the average of the contrasts of the dot images all over the image forming range.

13. The optical write-in head according to claim 12, wherein:
the lens array is a rod lens array in which gradient index rod lenses are arranged in one or a plurality of rows; and
a fluctuation in diameter of the rod lenses is about an average rod lens diameter ±0.5% or less.

14. The optical write-in head according to claim 12, wherein:
the lens array contains at least one row of a plurality of gradient index rod lenses; and
a fluctuation in light snaking period of the rod lenses is about an average light snaking period ±0.25% or less.

15. The optical write-in head according to claim 12, wherein:
the lens array contains at least one row of a plurality of gradient index rod lenses; and
if an arranging pitch of the lens elements is represented by sign P, a conjugate length of the lens array is represented by sign TC, and a maximum of angles between optical axes of the adjoining rod lenses is defined by an array parallelism of the lens elements, the array parallelism of the lens elements is P/TC or less.

16. The optical write-in head according to claim 12, wherein:
when the lens array has the characteristic [1], the predetermined width is set about 10 mm;
when the lens array has the characteristic [2], the predetermined width is set about 5 mm; and
when the lens array has the characteristic [3], the predetermined width is set about 1 mm.

17. The optical write-in head according to claim 12, wherein the dot light sources are arranged at a spacing of about 42 μm therebetween all over an effective width of the lens arrays.

18. The optical write-in head according to claim 12, wherein the contrast (MTF) of the dot images is defined by an equation of MTF(%)=(Imax−Imin)/(Imax+Imin)×100, where a maximum and a minimum of the light amount of a predetermined one of the dot images in the image forming range are Imax and Imin.

19. An image forming apparatus comprising:
a drum having a surface on which a photosensitive substance is formed; and
an optical write-in head which applies light carrying image information to the photosensitive substance, the optical write-in head includes:
an array light source having a plurality of dot light sources each selectively emitting the light corresponding to the image information; and
an lens array facing the array light source, wherein the lens array has a plurality of lens elements which corresponds to the plurality of dot light sources respectively,
wherein an angular aperture θ of each of the lens elements is set in a range of about 14 to 18°.

20. An image forming apparatus comprising:
a drum having a surface on which a photosensitive substance is formed; and
an optical write-in head which applies light carrying image information to the photosensitive substance, the optical write-in head includes:
an array light source having a plurality of dot light sources each selectively emitting the light corresponding to the image information; and
an lens array facing the array light source, wherein the lens array has a plurality of lens elements which corresponds to the plurality of dot light sources respectively, wherein:
an angular aperture θ of each of the lens elements is set in a range of about 14 to 18°;
a degree of overlapping m of the lens elements is set in a range of about 1.10 to 2.00; and
an effective diameter d of each of the lens elements is set in a range given by an equation of $4\theta/\sqrt{(4\ m^2/\alpha^2-1)} \leq d \leq 20\theta/(n\cdot\cos^{-1}(-\alpha/2/m)+\sqrt{(4\ m^2/\alpha^2-1)})$, where an optical axial refractive index of each of the lens elements is n, an arranging period of the lens elements of the lens array is D, and a filling ratio of the lens array is α (=d/D).

21. An image forming apparatus comprising:
a drum having a surface on which a photosensitive substance is formed; and
an optical write-in head which applies light carrying image information to the photosensitive substance, the optical write-in head includes:
an array light source having a plurality of dot light sources each selectively emitting the light corresponding to the image information,
a lens array facing the array light source, wherein the lens array has a plurality of lens elements which corresponds to the plurality of dot light sources respectively, each of the lens elements receiving the light from corresponding one of the dot light sources to focus the light on the photosensitive substance in order to forming a dot image, wherein:
an image forming range in which the lens array interconnects the dot images is divided at a predetermined width to define a plurality of image forming sections; and
the lens array has one of the following five characteristics:

[1] a characteristic that when the dot light sources are each lit, a difference between an average and the minimum of the contrast of the dot images in each of the image forming sections is about 18% or less;

[2] a characteristic that when the dot light sources are each lit, a difference between the maximum and the minimum of the contrasts of the dot images is about 30% or less in each of the image forming sections;

[3] a characteristic that when the dot light sources are each lit, the difference between the average of the contrasts of the dot image in each of the image forming sections and the average of the contrasts of the dot image in the adjoining image forming section is about 10% or less;

[4] a characteristic that when the dot light sources are each lit, a standard deviation of the contrasts of the dot images all over the image forming range is about 5% or less; and

[5] a characteristic that when the dot light sources are each lit, the standard deviation of the contrasts of the dot images all over the image forming range is about 12% or less of the average of the contrasts of the dot images all over the image forming range.

22. The image forming apparatus according to claim 21, wherein;

the lens array is one of a plurality of lens arrays;

the plurality of lens arrays superpose a plurality of colors of images to form one image; and a fluctuation in angle of optical axes of the lens arrays with respect to a lens array attaching reference is not more than about ±0.02/TC (radian, TC; conjugate length of the lens array).

23. The image forming apparatus according to claim 21, wherein the dot light sources are arranged at a spacing of about 42 $\mu$m therebetween all over an effective width of the lens arrays.

24. The image forming apparatus according to claim 21, wherein the contrast (MTF) of the dot images is defined by an equation of MTF(%)=(Imax−Imin)/(Tmax+Imin)×100, where a maximum and a minimum of the light amount of a predetermined one of the dot images in the image forming range are Imax and Imin.

* * * * *